United States Patent [19]

Fraidl et al.

[11] Patent Number: 5,138,989

[45] Date of Patent: Aug. 18, 1992

[54] INTERNAL COMBUSTION ENGINE WITH TWO OR MORE INLET VALVES PER ENGINE CYLINDER

[75] Inventors: Günter K. Fraidl; Friedrich Quissek, both of Pirka; Christian Fuchs, Graz, all of Austria

[73] Assignee: AVL Gesellschaft für Verbrennungskraftmaschinen und Messtechnik M.B.H. Prof. Dr.Dr.h.c. Hans List, Graz, Austria

[21] Appl. No.: 657,857

[22] Filed: Feb. 20, 1991

[30] Foreign Application Priority Data

Feb. 23, 1990 [AT] Austria ............................. 435/90

[51] Int. Cl.$^5$ ............................................. F02F 1/00
[52] U.S. Cl. ............................... 123/193.5; 123/308; 123/90.16; 123/302
[58] Field of Search ........... 123/308, 302, 432, 193 H, 123/188 M, 90.16

[56] References Cited

U.S. PATENT DOCUMENTS

| | | | |
|---|---|---|---|
| 4,211,189 | 7/1980 | Hamai | 123/308 |
| 4,548,175 | 10/1985 | Kawai et al. | 123/308 |
| 4,766,866 | 8/1988 | Takaii et al. | 123/302 |
| 4,926,804 | 5/1990 | Fukuo | 123/90.16 |
| 4,944,266 | 7/1990 | Hasegawa et al. | 123/302 |
| 4,957,081 | 9/1990 | Ito et al. | 123/193 H |
| 5,009,204 | 4/1991 | Ishii | 123/193 H |

FOREIGN PATENT DOCUMENTS 321033   6/1989   European Pat. Off. .
3371083 12/1987   Fed. Rep. of Germany .

*Primary Examiner*—E. Rollins Cross
*Assistant Examiner*—M. Macy
*Attorney, Agent, or Firm*—Watson, Cole, Grindle & Watson

[57] ABSTRACT

In an internal combustion engine with two or more inlet valves for each engine cylinder and roof-shaped boundary surfaces of the combustion chamber in the cylinder head—the main flow directions of the partial streams admitted into the combustion chamber by the inlet valves each forming an acute angle with the plane defined by the cylinder axes of a cylinder bank, i.e., the symmetry plane—, a strong torque of the charge in the combustion chamber is obtained at partial load without impairing the intake of charge at full load due to a deterioration of flow characteristics, by providing that the angle of at least one partial stream on one side of a plane going through the cylinder axis and being normal to the symmetry plane, be made larger by 10 to 40 degrees than the angle of at least one corresponding partial stream on the other side of this normal plane.

10 Claims, 5 Drawing Sheets

INTERNAL COMBUSTION ENGINE WITH TWO OR MORE INLET VALVES PER ENGINE CYLINDER

BACKGROUND OF THE INVENTION

This invention relates to an internal combustion engine with two or move inlet valves for each engine cylinder and roof-shaped boundary surfaces of the combustion chamber in the cylinder head, the main flow directions of the partial streams admitted into the combustion chamber by the inlet valves each forming an acute angle with the plane defined by the cylinder axes of a cylinder bank, i.e., the symmetry plane.

DESCRIPTION OF THE PRIOR ART

In internal combustion engines with several inlet valves an increase in charge motion may be achieved in certain operational states of the engine by switching off at least one inlet valve. Such intake systems typically have one straight intake passage and another intake passage parallel thereto, which is helical or twisted. The straight intake passage is provided with a throttling element to reduce or interrupt the flow of the fuel/air mixture through the straight intake passage under particular working conditions and thus increase the torque in the combustion chamber. An additional torque or swirling motion of the charge in the combustion chamber may also be obtained, at least partly, without the specific non-symmetrical configuration of the individual intake passages, i.e., by providing a shut-off device in the respective intake passage or by actuating the inlet valves in different ways, for instance, as described in EP-A1 0 321 033.

In many instances the main intake passages are shut off and the intake is effected via a side passage opening into one of the main intake passages immediately before the inlet valve, as described in Germain Laid Open No. 37 18 083, for example.

Another conventional solution is the unsymmetrical configuration of the intake passages, one passage usually being helical or twisted, or having a "vortex end". Without being influenced by the other intake passage, such passages will produce a marked inlet swirl, i.e., a rotary motion of the charge about an axis parallel to the cylinder axis. If the straight intake passage is shut, this configuration will permit considerable charge motion at partial load; at full load, however, or at high engine speeds, when air flow rates are high, the maximum flow rates obtainable with such a helical or spiral configuration of the intake passage are much smaller than with other comparable configurations, even if the straight passage is opened. Besides, the twisted shape of one intake passage will accelerate the combustion process at high speeds, which will increase the combustion noise.

In this context it is generally known that the main flow directions of the partial streams entering the combustion chamber through the inlet valves form acute angles with the symmetry plane as defined in the opening paragraph, which is parallel to the crankshaft axis (cf. EP-A1 0 085 258, for example).

In addition, a configuration is known from EP-A2 0 321 313, in which three inlet valves per engine cylinder are symmetrically arranged relative to a plane going through the cylinder axis and being normal to the symmetry plane defined above. The middle intake passage situated in this normal plane has an angle of inclination different from that of the two outer passages. It will not be possible, however, to influence the rotation of the cylinder charge with this configuration.

SUMMARY OF THE INVENTION

It is an object of the invention to avoid the disadvantages of the known types of design and to obtain a strong torque of the charge in the combustion chamber, in particular under conditions of partial load, without impairing the intake of charge at full load due to a decline in flow characteristics, which would lead to a deterioration of engine performance.

In the invention this object is achieved by providing that the angle of at least one partial stream on one side of a plane going through the cylinder axis and being normal to the symmetry plane, be larger by 10° to 40° than the angle of at least one corresponding partial stream on the other side of this normal plane. Unlike the known systems for generating strong charge motion, the invention provides for two intake passages designed for good air flow rates, which will permit an increase in charge motion as a result of the specific alignment of their entrance angles into the combustion chamber.

In further development of the invention the angles of partial streams relative to the symmetry plane are preferably determined by the design of the intake passages, the axis of the intake passage into the first inlet valve coinciding with the axis of this inlet valve, at least immediately before this inlet valve, or being parallel thereto, and the axis of the intake passage into the second inlet valve subtending an acute angle with the axis of this inlet valve, at least immediately before this second inlet valve. In this way the first intake passage, the so-called "neutral passage", opens into the combustion chamber at an angle relative to the symmetry plane that is comparatively acute, such that the resulting main flow direction of the partial stream of the admitted mixture will have only a small angle relative to the symmetry plane. The configuration of the passage is such that the entire disk of the inlet valve will be subject to the incoming stream in as uniform a manner as possible, leading to a main flow direction approximately coinciding with the axis of the inlet valve. The second passage, the so-called "tangential passage", opens into the combustion chamber an at angle relative to the symmetry plane that is larger by 10° to 40°, and is designed such that the main flow direction of the admitted portion of the mixture has the maximum possible angle relative to the symmetry plane. Due to the special configuration of the intake passage, it is mainly the part of the valve disk situated closer to the exhaust valves that will be subject to the incoming stream in this instance. Due to the small entrance angle of the intake passage into the combustion chamber and the additional non-symmetric deflection at the valve disk, the main flow direction of the incoming stream will be very flat.

In the invention the volume entering through the neutral passage at a small angle relative to the symmetry plane will have a much smaller momentum normal to the symmetry axis than that coming in through the tangential passage. As a result, a rotary motion both about an axis parallel to the crankshaft and about an axis parallel to the cylinder axis will be initiated. This increase in charge motion will accelerate the combustion process, especially under conditions of partial load; in particular, the flame propagation phase will be reduced considerably.

In further development of the invention a preferred variant provides that the intake passages run separately both in the cylinder head and in the intake manifold until they open into a common manifold serving several engine cylinders at once.

In an enhanced variant of the invention a fuel injection valve is provided in each of the intake passages, the respective amount of fuel to be injected by each valve varying with the specific operating conditions of the engine (load, speed). As a consequence, layering of the charge may be initiated in the intake pipe to assist combustion, providing different ratios for the individual layers of the fuel/air mixture in the combustion chamber, and upheld until the time of ignition. This will result in higher combustion stability, improved leaning characteristics, greater tolerance of exhaust gas recycling and improved fuel consumption and emission values.

The invention also permits the intake passages to run separately until they open into a joint manifold serving several engine cylinders, while a defined opening is provided between the two intake passages in the vicinity of the inlet valves. In this instance charge layering is achieved by providing identical injection volumes in the two intake passages while throttling the air flow in the neutral passage, such that a comparatively rich mixture is admitted through the neutral passage whereas the mixture admitted through the tangential passage is comparatively lean. Throttling is achieved by shutting the suction pipe leading into the neutral passage, while maintaining a defined volume of leakage air, if required, and by providing for a cross-flow from the tangential passage through the precisely defined opening between the two passages.

According to the invention this precisely defined opening will additionally permit both intake passages to be supplied with fuel from one injection valve only, i.e., by arranging one injection valve per cylinder symmetrically to the two intake passages in such a way that the two fuel jets of this injection valve are directed towards the disks of the inlet valves through the defined opening.

Due to the specific design of the intake passages and the ensuing charge motion, layering of the charge with its portions of rich mixture in the vicinity of the spark plug and lean mixture near the walls of the combustion chamber may also be achieved by providing that the formation of the mixture take place in the combustion chamber itself, e.g., by high-pressure airless injection or fuel air injection. The layers may be maintained until the time of ignition, thus leading to a more rapid and stable combustion process.

In further development of the invention a throttle element may be provided in flow direction before the injection valve(s) in that intake passage from which the partial stream forming the smaller angle with the symmetry plane will emerge and in which the stream of intake air will be throttled in correspondence with the operational state of the engine. This means that the neutral passage is throttled while the straight or tangential passage remains open in all states of the engine.

In the instance of a non-symmetrical configuration of the intake passages as mentioned above, however, the straight intake passage is shut and the additional rotary charge motion is essentially effected by the twisted shape of the open intake passage. With this kind of arrangement undesirable charge layerings affecting the combustion process cannot be excluded, if only one injection valve is used for each engine cylinder.

In conjunction with the configuration of the intake passages as proposed by the invention and the suitable positioning of the injection valve(s), a desirable charge layering assisting combustion is initiated and maintained until the time of ignition in addition to the increase in charge motion.

Throttling of the air volume entering through the neutral passage cannot only be effected by a throttling element as described above, as the invention also permits throttling of the partial stream of intake air forming the smaller angle with the symmetry plane by changing the lift characteristic of the inlet valve depending on the operational state of the engine. This change in the characteristic of the valve lift is effected in a known manner, i.e., preferably by closing the inlet valve early. In addition to the early closing of the inlet valve, for instance, by electrohydraulic control of an intermediate element between the inlet valve and the camshaft, the characteristic of the valve lift may also be modified by other known mechanisms, such as those varying the maximum lift of the inlet valve.

BRIEF DESCRIPTION OF THE DRAWINGS

The invention will now be further described by way of example only with reference to the accompanying drawings, in which.

DETAILED DESCRIPTION OF THE PREFERRED EMBODIMENTS

Figure 1:
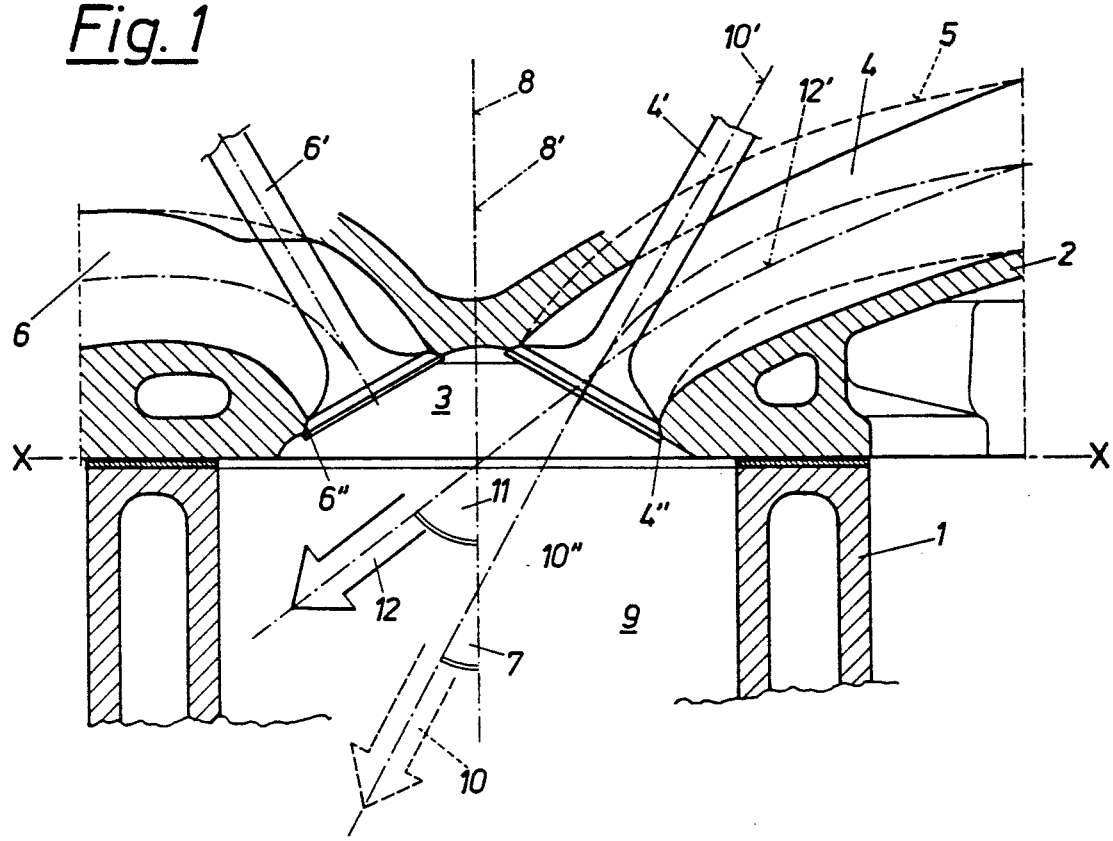
FIG. 1 shows a partial section through an internal combustion engine proposed by the invention, FIG. 2 gives a view from above, FIGS. 3 and 4 each give a detail of a variant of FIGS. 1 and 2, FIGS. 5 and 6 show another variant of the invention as a longitudinal section through an intake passage and a view from above of this passage.
Figure 2:
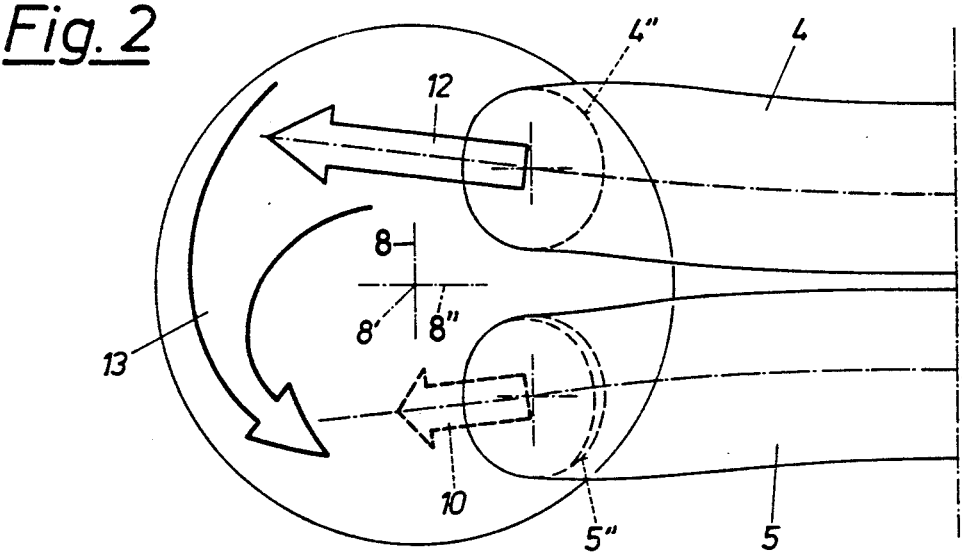
Figure 3:
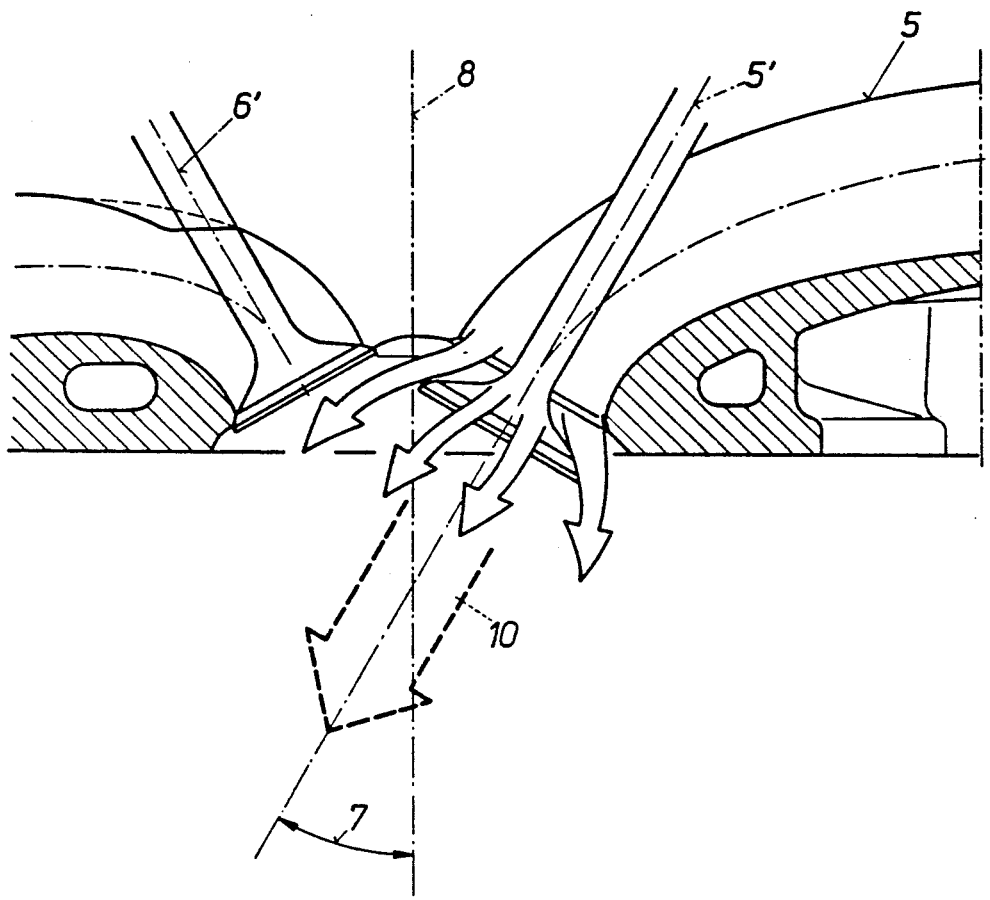

In the internal combustion engine of the invention presented in FIGS. 1 and 2 the cylinder block has the reference number 1 and the cylinder head attached thereto is marked 2. The cylinder head 2 contains the combustion chamber 3 with its roof-shaped walls, and the intake passages 4, 5 and the exhaust passage or passages 6. The corresponding inlet and exhaust valves are marked 4' and 6', the corresponding cross-sections 4" and 5" or 6". The intake passage 5, i.e., the so-called neutral passage, opens into the combustion chamber 3, or rather, the cylinder space 9, forming a comparatively acute angle 7 with a symmetry plane 8 defined by the engine cylinder axes 8' of a cylinder bank. The intake passage 5 is configured such that the resulting main flow direction of the admitted portion of the mixture will form a small angle 7 with the symmetry plane 8. Due to the specific configuration of this passage, the entire disk of the inlet valve is subjected to the intake stream as uniformly as possible (cf. FIG. 3), and the main flow direction approximately coincides with the inlet valve axis 10' as indicated by the broken arrow 10. The intake passage 5 is indicated by a broken line in FIG. 1.

Figure 4:
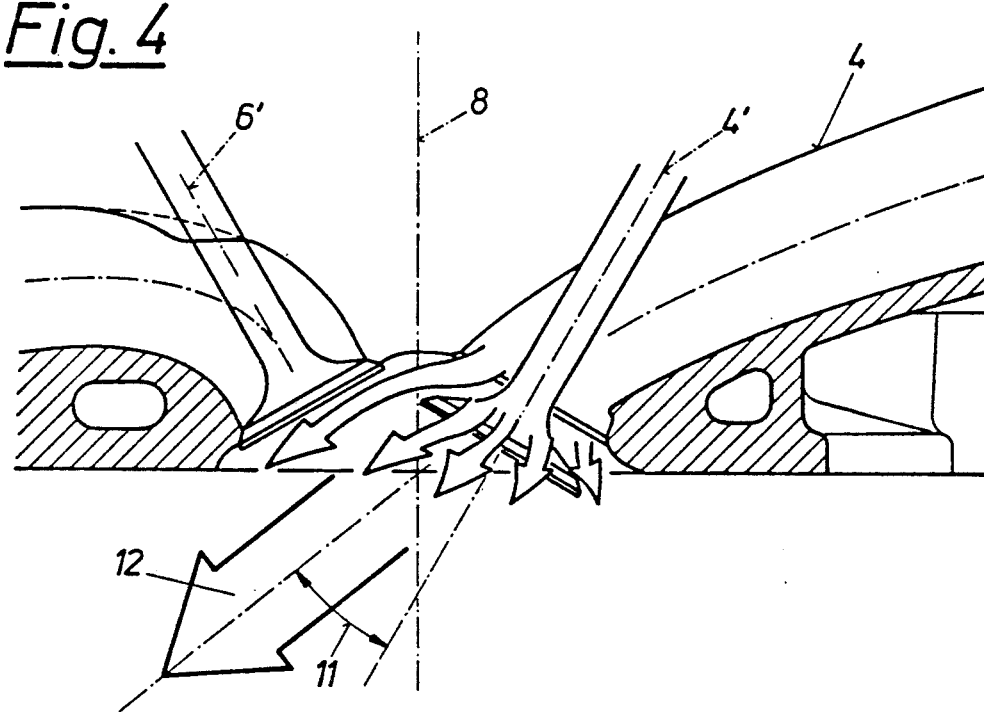

The second intake passage 4, i.e., the so-called tangential passage, opens into the combustion chamber 3, or rather, the cylinder space 9, forming an angle 11 with the symmetry plane 8, which angle is larger by 10°–40° than the angle 7. This angle 11 is chosen such that the resulting main flow direction of the admitted portion of the mixture will subtend a maximum angle with the symmetry plane, as indicated by the full arrow 12 in FIGS. 1 and 4. Due to the specific configuration of this intake passage 4, it is mainly the part of the valve disk closer to the exhaust valves 6' that is subjected to the intake stream, as is shown in FIG. 4. Because of the small entrance angle of the intake passage 4 into the combustion chamber 3, or rather, the cylinder space 9, and the additional deflection at the valve disk, which is strongly unsymmetrical (cf. FIG. 4), the main flow direction will be rather flat, as is indicated by the full arrow 12.

As can be appreciated from FIG. 1, when both intake valves 4', 5' are positioned against the mouths 4'', 5'' of the intake passages 4, 5, they will be located at an equivalent distance from a plane X which is perpendicular to the cylinder axis 8'. At the same time, as is shown in FIG. 2, the two intake passages 4 and 5 are situated on either side of a plane 8'' normal to the symmetry plane 8. It is an essential feature of the invention that the angle of the partial stream 12 on one side of the normal plane 8'' is larger by 10°–40° than the angle 7 of the partial stream 10 on the other side of the normal plane 8''.

In the invention the volume entering the combustion chamber through the neutral passage 5 at a small angle 7 relative to the symmetry plane 8, has a much smaller momentum normal to the symmetry plane 8 than the volume entering through the tangential passage 4. Thus, a rotary motion both about an axis parallel to the crankshaft and about an axis parallel to the cylinder axis 8' is initiated. This increase in charge motion will accelerate combustion, especially under conditions of partial load; in particular the phase of flame propagation will be reduced.

In addition, the charge motion may initiate charge layering in the intake passages to assist combustion (the individual layers of charge in the combustion chamber having different fuel/air ratio), and maintain this layering until the time of ignition. This will result in higher combustion stability, improved leaning characteristics, greater tolerance of exhaust gas recycling, and subsequent improvements in fuel consumption and pollutant emission.

Figure 5:
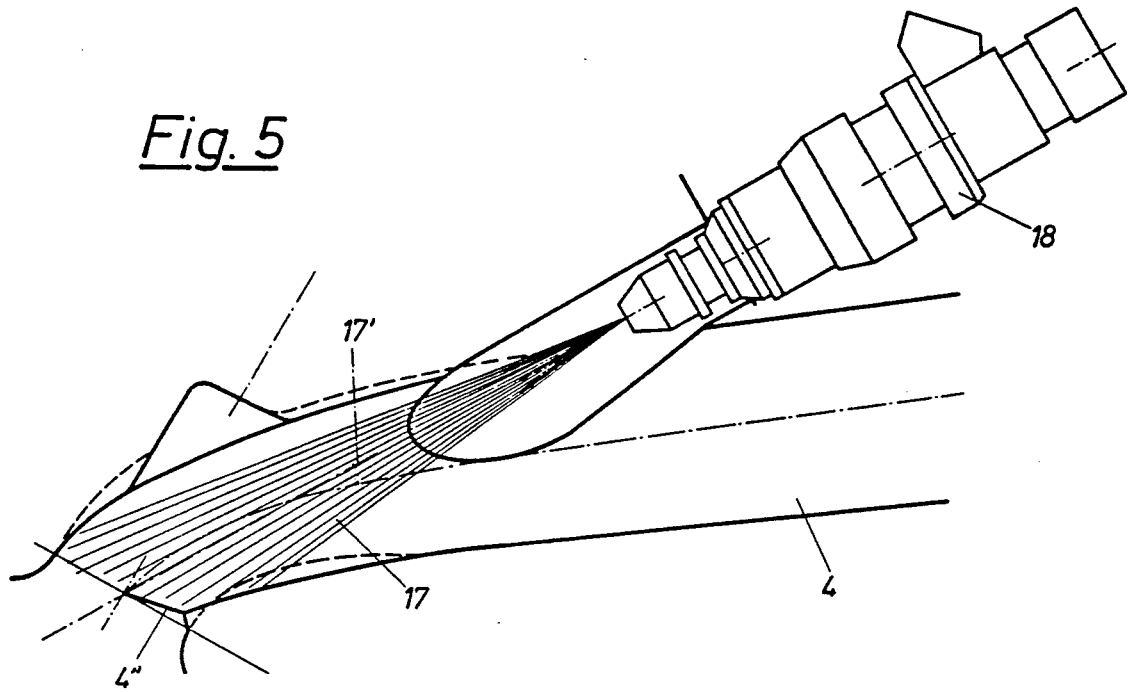
Figure 6:
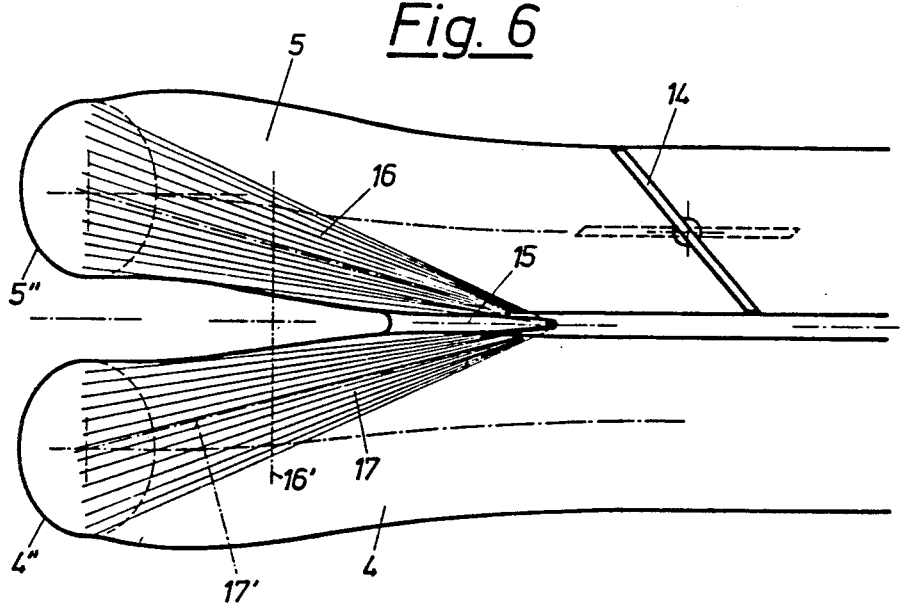

In the variant shown in FIGS. 5 and 6 the neutral passage 5 contains a throttling device configured as a throttle flap 14, whereas the tangential passage 4 remains open constantly. Between the tangential passage 4 and the neutral passage 5 a precisely defined opening 15 is situated, through which the two jets 16 and 17 of the injection nozzle 18 will pass, whose axes 16' and 17' are directed towards the centers of the valve inlet cross-sections 5'' and 4''. By maintaining identical injection volumes in the two intake passages while throttling the air flow in the neutral passage 5, a comparatively rich mixture is admitted through the neutral passage 5, while the mixture entering through the tangential passage 4 is rather lean. This will lead to a corresponding layering of the charge, the more explosive richer mixture prevailing in the area of the spark plug.

Throttling in the neutral passage 5 by means of the throttle flap 14 is achieved by maintaining a defined volume of leakage air, if required, and by providing for a cross-flow from the tangential passage through the precisely defined opening 15. Because of the special configuration of the intake passage the charge layers, i.e., rich mixture near the spark plug and lean mixture near the walls of the combustion chamber, may be upheld until the time of ignition.

Figure 7:
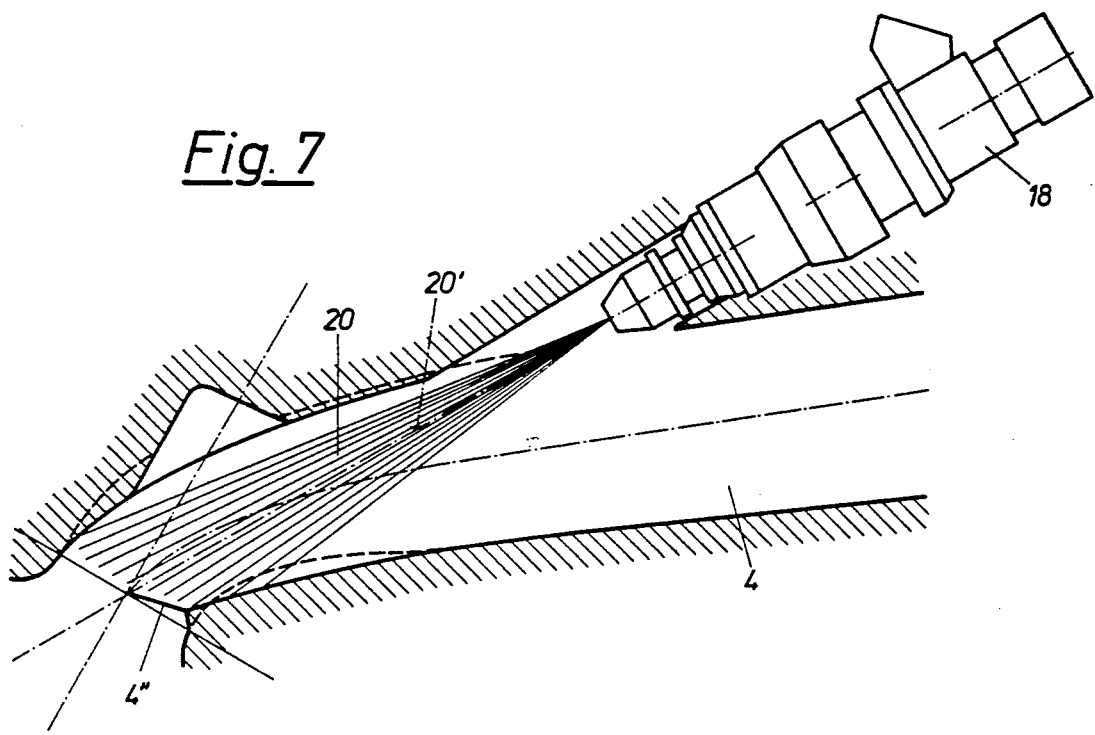
FIG. 7 shows another variant of the invention, FIG. 8 gives a view from above of this variant, FIGS. 9 and 10 give characteristics of the valve lift of a variant as proposed by the invention.
Figure 8:
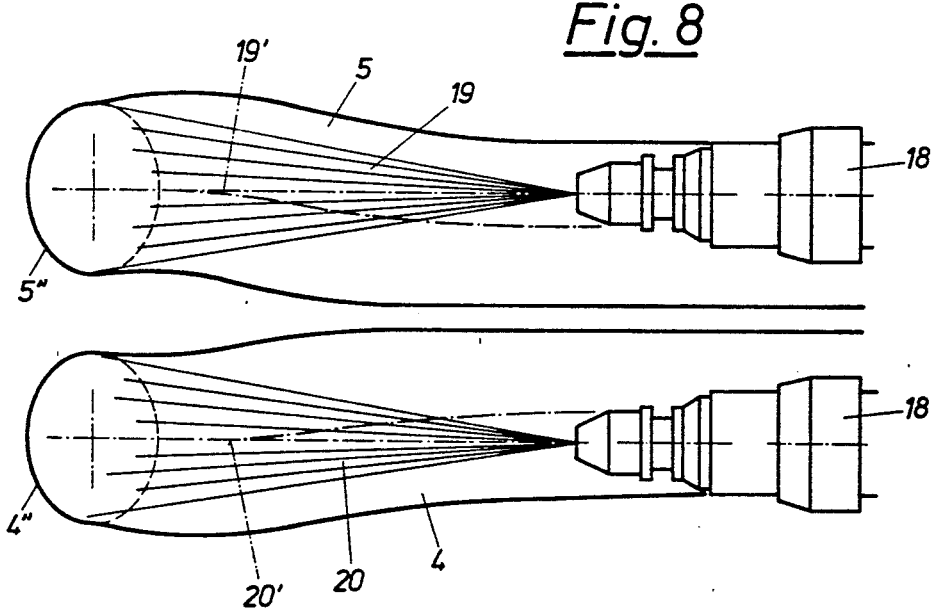

The variant shown in FIGS. 7 and 8 differs from that of FIGS. 5 and 6 by the complete separation of the neutral passage 5 and the tangential passage 4, each of which has an injection nozzle 18, the axes 19' and 20' of whose jets 19 and 20 are directed towards the centers of the valve inlet cross-sections 5'' and 4''. By varying the fuel volumes injected by the nozzles, any desired charge layerings may be achieved.

Figure 9:
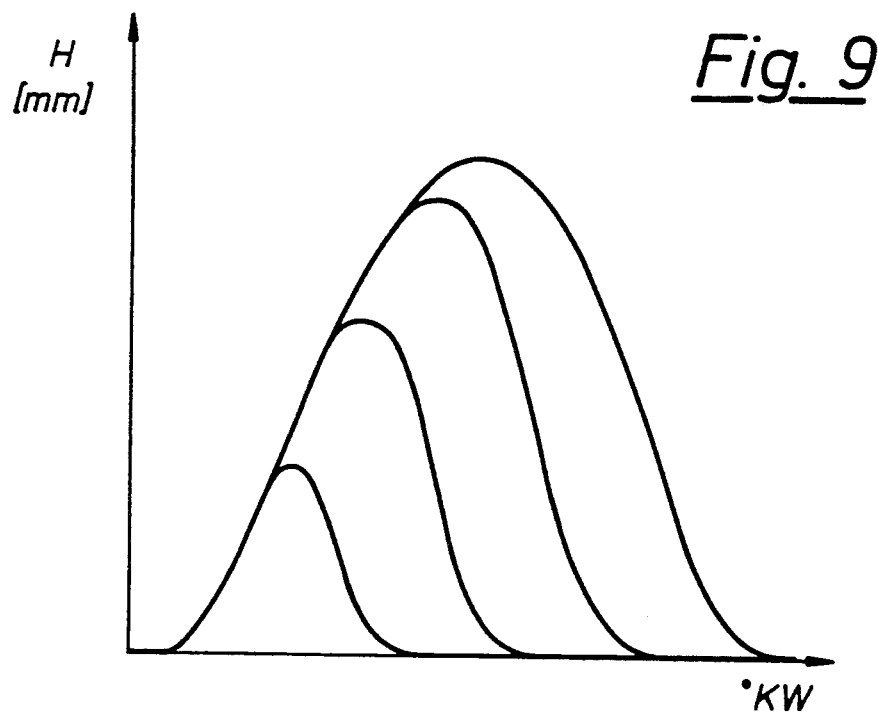
Figure 10:
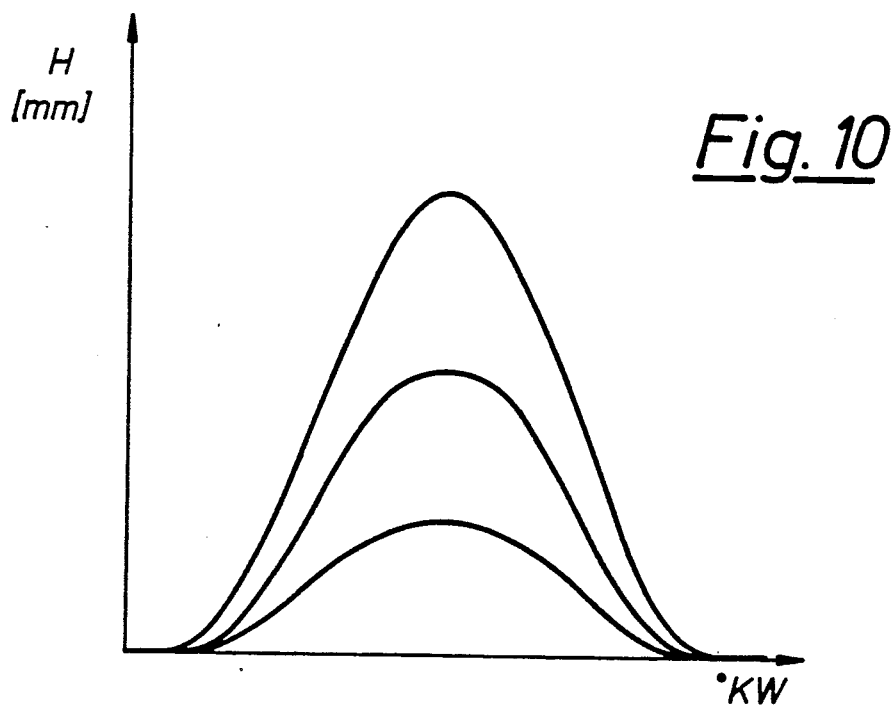

Throttling of the air volume taken in through the neutral passage 5 may be achieved not only with the use of a throttle element in the neutral passage, but also by modification of the valve lift characteristic. This modification may be obtained in a known manner, i.e., preferably by closing the inlet valve prematurely, which may be effected, for example, by electrohydraulically controlling an intermediate element between inlet valve and camshaft. The effect of such a device is shown in FIG. 9, where the valve lift H is plotted over the crank angle KW. It would also be possible to vary the maximum valve lift H, as is shown in FIG. 10.

We claim:

1. An internal combustion engine which includes a plurality of cylinders having axes which are aligned in a symmetry plane; a cylinder head which defines a combustion chamber at an end of one of said cylinders, said cylinder head defining roof-shaped boundary surfaces and providing first and second intake passages which open into said combustion chamber at mouths located on opposite sides of a plane which extends through the axis of said one cylinder and extends perpendicularly to said symmetry plane, and first and second inlet valves which, when closed against the respective mouths of said first and second intake passages, are at an equivalent distance from a plane perpendicular to the axis of said one cylinder, such that (1) a first partial fluid stream moving in a downstream flow direction past said first inlet valve mainly flows towards said symmetry plane at a first acute angle, (2) a second partial fluid stream passing in a downstream flow direction past said second inlet valve mainly flows towards said symmetry plane at a second acute angle, and (3) wherein said second acute angle is larger than said first acute angle by 10° to 40°.

2. An internal combustion engine according to claim 1, wherein said first intake valve defines a first valve axis, wherein said first intake passage defines a first passage axis immediately upstream of said first intake valve which coincides with said first valve axis, wherein said second intake valve defines a second valve axis, wherein said second intake passage defines a second passage axis immediately upstream of said second intake valve, said second passage axis subtending an acute angle with said second valve axis.

3. An internal combustion engine according to claim 1, wherein said first and second intake passages run separately in said cylinder head and in an intake manifold until they open into a common manifold serving several of said engine cylinders.

4. An internal combustion engine according to claim 3, wherein a fuel injection valve is provided in each of said first and second intake passages, a respective amount of fuel to be injected by each of said valves depending on specific operating conditions of said internal combustion engine.

5. An internal combustion engine according to claim 4, wherein a throttle element is provided in the flow direction before said fuel injection valve in said first intake passage and wherein said throttle element is operated in correspondence with the operational state of said internal combustion engine.

6. An internal combustion engine according to claim 1, wherein said first and second intake passage run separately until they open into a joint manifold serving several of said engine cylinders, wherein an opening is provided between said first and second intake passages in the vicinity of said first and second inlet valves.

7. An internal combustion engine according to claim 6, wherein a fuel injection valve having two fuel jets is arranged symmetrically to said first and second intake passages and wherein said fuel jets of said fuel injection valve are directed towards said first and second intake passages.

8. An internal combustion engine according to claim 6, wherein a throttle element is provided in the flow direction before said fuel injection valve in said first intake passage and wherein said throttle element is operated in correspondence with the operational state of said internal combustion engine.

9. An internal combustion engine according to claim 1, comprising means for direct high-pressure airless injection or direct fuel air injection into said combustion chamber.

10. An internal combustion engine according to claim 1, wherein throttling of said first partial stream is effected by changing the lift characteristic of said first inlet valve depending on the operational state of said internal combustion engine.

* * * * *